US012789404B2

(12) United States Patent
Tanaka et al.

(10) Patent No.: US 12,789,404 B2
(45) Date of Patent: Nov. 10, 2026

(54) OPTICAL FIBER CUTTING DEVICE AND METHOD OF CUTTING OPTICAL FIBER

(71) Applicant: Fujikura Ltd., Tokyo (JP)

(72) Inventors: Shogo Tanaka, Chiba (JP); Yuya Kurosaka, Chiba (JP)

(73) Assignee: Fujikura Ltd., Tokyo (JP)

(*) Notice: Subject to any disclaimer, the term of this patent is extended or adjusted under 35 U.S.C. 154(b) by 140 days.

(21) Appl. No.: 18/562,678

(22) PCT Filed: May 20, 2022

(86) PCT No.: PCT/JP2022/020976

§ 371 (c)(1),
(2) Date: Nov. 20, 2023

(87) PCT Pub. No.: WO2022/244868

PCT Pub. Date: Nov. 24, 2022

(65) Prior Publication Data

US 2024/0253260 A1 Aug. 1, 2024

(30) Foreign Application Priority Data

May 21, 2021 (JP) ................................. 2021-086140

(51) Int. Cl.
*B26D 7/04* (2006.01)
*B26D 1/08* (2006.01)
(Continued)

(52) U.S. Cl.
CPC ................. *B26D 7/04* (2013.01); *B26D 1/08* (2013.01); *B26F 3/002* (2013.01); *G02B 6/25* (2013.01); *B26D 2210/00* (2013.01)

(58) Field of Classification Search
CPC ............ B26D 1/045; B26D 1/08; B26D 7/04; B26F 3/002; G02B 6/245; G02B 6/25;
(Continued)

(56) References Cited

U.S. PATENT DOCUMENTS 4,017,013 A 4/1977 Hawk et al.
5,791,539 A * 8/1998 Shill .................... B26D 7/1827 225/101
2005/0230052 A1 10/2005 Christopher et al.

FOREIGN PATENT DOCUMENTS

CN 106033138 A 10/2016
CN 217833765 U 11/2022
(Continued)

OTHER PUBLICATIONS

Gloge et al. "Optical fiber end preparation for low-loss splices" The Bell System Technical Journal, vol. 52, No. 9, Nov. 1973 (10 pages).
(Continued)

*Primary Examiner* — Evan H Macfarlane
(74) *Attorney, Agent, or Firm* — Osha Bergman Watanabe & Burton LLP

(57) ABSTRACT

An optical fiber cutting device includes: a pair of grippers that grip an optical fiber having a glass portion exposed from the optical fiber; a gripping force applier disposed in one or both of the pair of grippers and that generates and changes a gripping force; a tension applier that applies tension to the optical fiber by separating the pair of grippers from each other in a longitudinal direction of the optical fiber; a tension measuring sensor that measures the tension; a controller that controls the gripping force; and a blade disposed between the pair of grippers in the longitudinal direction and that forms a scratch on the glass portion.

5 Claims, 8 Drawing Sheets

(51) Int. Cl.
*B26F 3/00* (2006.01)
*G02B 6/25* (2006.01)

(58) Field of Classification Search
CPC .......... B23Q 3/06; B23Q 3/062; B23Q 3/064; B23Q 3/065; B23Q 3/066
See application file for complete search history.

(56) References Cited

FOREIGN PATENT DOCUMENTS

| | | | | |
|---|---|---|---|---|
| EP | 3018511 | A1 * | 5/2016 | ............ G02B 6/245 |
| JP | S5757404 | U | 4/1982 | |
| JP | 2016090943 | A | 5/2016 | |
| JP | 2016514860 | A | 5/2016 | |
| JP | 2020160409 | A | 10/2020 | |
| KR | 101294250 | B1 | 8/2013 | |
| KR | 2016-0055667 | A | 5/2016 | |

OTHER PUBLICATIONS

International Search Report issued in International Application No. PCT/JP2022/020976, mailed Aug. 1, 2022 (3 pages).

* cited by examiner

OPTICAL FIBER CUTTING DEVICE AND METHOD OF CUTTING OPTICAL FIBER

CROSS-REFERENCE TO RELATED APPLICATIONS

Priority is claimed on Japanese Patent Application No. 2021-086140 filed in Japan on May 21, 2021, the content of which is incorporated herein by reference.

TECHNICAL FIELD

The present invention relates to an optical fiber cutting device and a method of cutting an optical fiber.

BACKGROUND

Patent Literature 1 discloses an optical fiber cutting device in which an optical fiber is gripped by two grippers and the optical fiber is cut by applying tension to the optical fiber and pressing a blade against a glass portion.

PATENT LITERATURE

[PTL 1]

Japanese Unexamined Patent Application, First Publication No. 2016-90943

As a result of intensive studies, the inventors of the present application found that, if a gripping force of an optical fiber is too large, there is a problem in that a desired cut surface cannot be obtained at the time of cutting. Also, if the gripping force of the optical fiber is too small, there is a problem in that slipping occurs between the optical fiber and a gripper and an appropriate tension is not applied.

SUMMARY

One or more embodiments of the invention provide an optical fiber cutting device and a method of cutting an optical fiber in which an optical fiber can be reliably cut by gripping the optical fiber with an appropriate gripping force.

An optical fiber cutting device according to one or more embodiments of the invention includes a pair of grippers configured to grip an optical fiber having a glass portion exposed from the optical fiber, a gripping force applier provided in at least one of the pair of grippers, the gripping force applier being configured to change a gripping force, a tension applier configured to apply tension to the optical fiber by separating the pair of grippers from each other in a longitudinal direction of the optical fiber, a tension measuring sensor configured to measure the tension, a controller configured to control a gripping force generated by the gripping force applier, and a blade positioned between the pair of grippers in the longitudinal direction, the blade forming a scratch on the glass portion from the optical fiber. The controller determines a set gripping force on the basis of a minimum non-slip gripping force in a state in which a predetermined tension is applied to the optical fiber, the minimum non-slip gripping force is a minimum gripping force in which at least one of the pair of grippers is able to grip the optical fiber without slipping. In a state in which at least one of the pair of grippers grips the optical fiber with the set gripping force, the optical fiber is cut by applying tension to the optical fiber, and a scratch is formed on the optical fiber by the blade.

According to one or more embodiments, in cutting the optical fiber, the optical fiber is gripped by the set gripping force determined on the basis of the minimum non-slip gripping force. Therefore, when the optical fiber is cut, the gripping force of the optical fiber becoming excessively large can be avoided, and an angle of a cut surface of the optical fiber becoming large can be suppressed. Also, slipping of the optical fiber because of an insufficient gripping force at the time of cutting can be suppressed. Conventionally, there have been cases in which a magnitude of the gripping force is determined on the basis of experience or intuition of an operator. In contrast, as in the optical fiber cutting device according to one or more embodiments, when the set gripping force is determined on the basis of the minimum non-slip gripping force, variation among workers in cutting work can be suppressed, and the optical fiber can be cut more stably and reliably.

Here, the optical fiber cutting device according to one or more embodiments may further include a storage configured to store at least one of the minimum non-slip gripping force, the set gripping force, a control value for applying the minimum non-slip gripping force, and a control value for applying the set gripping force.

Here, in the optical fiber cutting device according to one or more embodiments, the gripping force applier may include a first gripping force applier configured to change a gripping force of one of the pair of grippers and a second gripping force applier configured to change a gripping force of the other of the pair of grippers. The controller may control a gripping force generated by the first gripping force applier and a gripping force generated by the second gripping force applier.

Here, in the optical fiber cutting device according to one or more embodiments, the controller may control the gripping force generated by the first gripping force applier and the gripping force generated by the second gripping force applier to be equal to each other.

In this case, when the minimum non-slip gripping force or the like is stored in the storage, the minimum non-slip gripping force or the like can be read and used in the next and subsequent operations. It is thought that the minimum non-slip gripping force is substantially the same if optical fibers of the same type are used. That is, once the minimum non-slip gripping force is measured, an appropriate gripping force can be obtained in subsequent cutting of optical fibers of the same type by employing the set gripping force on the basis of the same value of the minimum non-slip gripping force. Accordingly, an efficiency when optical fibers are repeatedly cut can be improved.

Also, a method of cutting an optical fiber according to one or more embodiments of the invention includes gripping an optical fiber having a glass portion exposed from the optical fiber by a first gripper and a second gripper, obtaining a minimum non-slip gripping force by separating the first gripper and the second gripper from each other in a longitudinal direction of the optical fiber while changing a gripping force of the first gripper, the minimum non-slip gripping force being a minimum gripping force in which the first gripper is able to grip the optical fiber without slipping in a state in which a predetermined tension is applied to the optical fiber, gripping the optical fiber by the first gripper with a set gripping force determined on the basis of the minimum non-slip gripping force, and cutting the optical fiber by applying a blade to the glass portion from the optical fiber positioned between the first gripper and the second gripper.

According to the optical fiber cutting method of one or more embodiments, the optical fiber can be gripped and cut with an appropriate gripping force as in the optical fiber cutting device described above.

In the optical fiber cutting method according to one or more embodiments, the optical fiber is gripped so as to cause slipping in the first gripper, the first gripper and the second gripper are separated from each other in the longitudinal direction of the optical fiber while increasing a gripping force of the first gripper, and the gripping force when tension applied to the optical fiber reaches a predetermined threshold value may be defined as the minimum non-slip gripping force.

In this case, in measuring the minimum non-slip gripping force, occurrence of plastic deformation due to a large gripping force applied to the cladding of the optical fiber can be suppressed. Accordingly, the optical fiber after measuring the minimum non-slip gripping force as it is can be cut, and the cut optical fiber can be utilized.

Also in the optical fiber cutting method according to one or more embodiments, the optical fiber is gripped by the first gripper so as not to cause slipping, the first gripper and the second gripper are separated from each other in the longitudinal direction of the optical fiber while reducing a gripping force of the first gripper, and the gripping force when slipping occurs between the first gripper and the optical fiber may be defined as the minimum non-slip gripping force.

In this case, in measuring the minimum non-slip gripping force, a stroke when the pair of grippers are separated from each other can be reduced. More specifically, when in a state in which slackening of the optical fiber between the pair of grippers is eliminated and tension acts on the optical fiber, any further relative movement of the grippers is not necessary. Therefore, a size of the optical fiber cutting device in the longitudinal direction can be reduced, and a time required for measuring the minimum non-slip gripping force can also be reduced.

Here, in the cutting method of an optical fiber according to one or more embodiments, the minimum non-slip gripping force may be obtained by separating the first gripper and the second gripper from each other in the longitudinal direction of the optical fiber while changing a gripping force of the first gripper and a gripping force of the second gripper.

Here, in the cutting method of an optical fiber according to one or more embodiments, the gripping force of the first gripper and the gripping force of the second gripper may be changed such that the gripping force of the first gripper and the gripping force of the second gripper are equal to each other.

According to one or more embodiments of the invention, it is possible to provide an optical fiber cutting device and a method of cutting an optical fiber in which an optical fiber can be reliably cut by gripping the optical fiber with an appropriate gripping force.

DETAILED DESCRIPTION

First Embodiments

Hereinafter, an optical fiber cutting device of first embodiments will be described with reference to the drawings.

Figure 1:
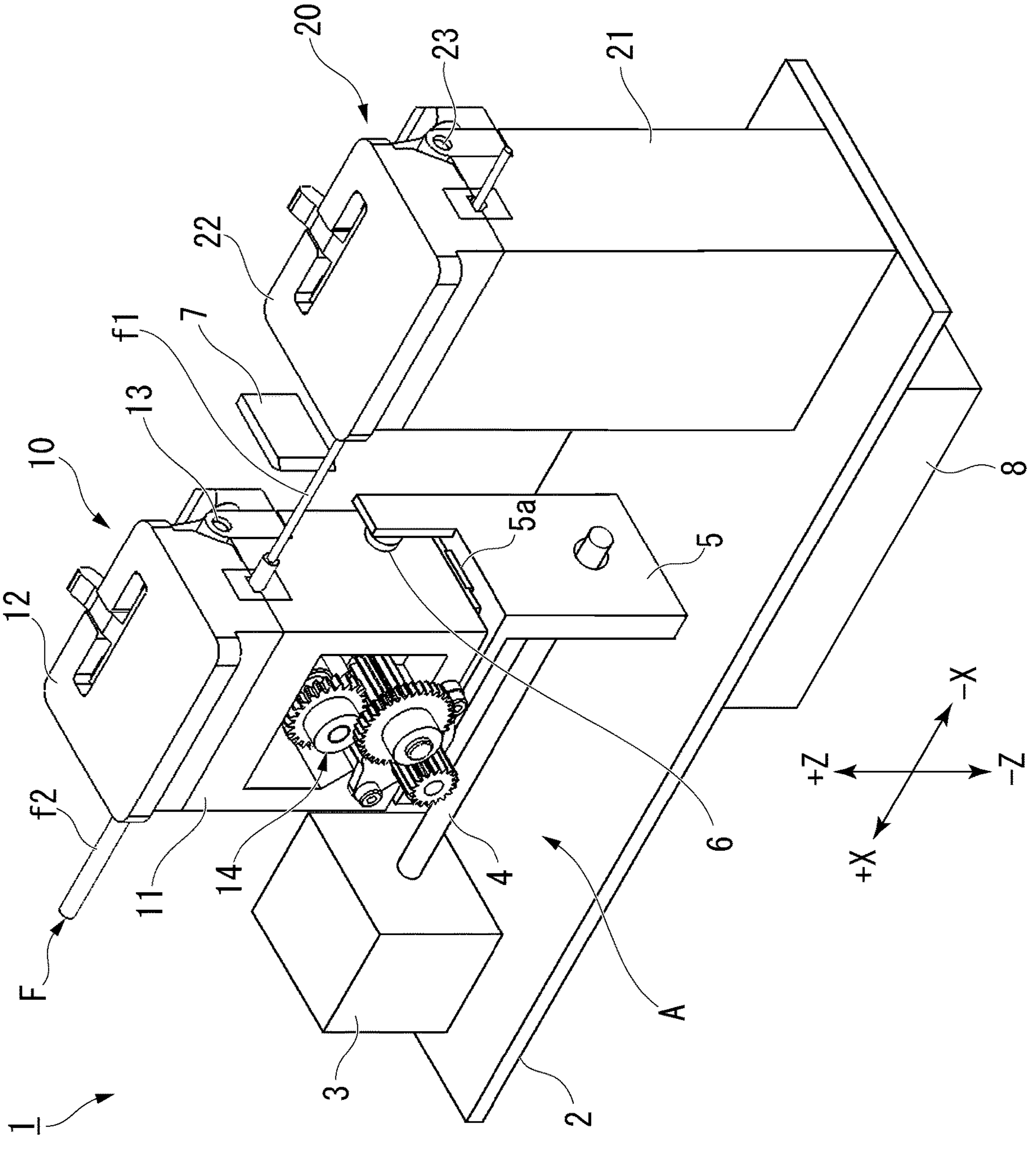
FIG. 1 is a perspective view showing an optical fiber cutting device according to first embodiments.

As shown in FIG. 1, the optical fiber cutting device 1 includes a base 2, a tension applier A, a tension measuring sensor 6, a blade 7, a controller 8, a first gripper 10, and a second gripper 20. The first gripper 10 and the second gripper 20 are configured to be able to grip one optical fiber F at different positions.

The optical fiber F includes a glass portion f1 and a cladding f2 that coats the glass portion f1. The cladding f2 is formed of a resin or the like. At a portion of the optical fiber F positioned between the first gripper 10 and the second gripper 20, the cladding f2 is removed and the glass portion f1 is exposed at least at a part of the optical fiber F. The glass portion f1 is an exposed portion that is exposed from the optical fiber F to the outside of the optical fiber F. When the blade 7 is applied to the glass portion f1 in a state in which the first gripper 10 and the second gripper 20 apply a predetermined tension to the optical fiber F, the optical fiber F is cut.

Definition of Directions

In one or more embodiments, a longitudinal direction of the optical fiber F is simply referred to as a longitudinal direction X. The longitudinal direction X is also a direction in which the first gripper 10 and the second gripper 20 are aligned. Regarding positions in which the two grippers are disposed in the longitudinal direction X, a side of the first gripper 10 is referred to as a +X side, and a side of the second gripper 20 is referred to as a −X side. One direction perpendicular to the longitudinal direction X is referred to as a vertical direction Z. One side (+Z side) in the vertical direction Z is referred to as an upward direction, and a side (−Z side) opposite thereto is referred to as a downward direction.

The first gripper 10 and the second gripper 20 are disposed at a distance from each other in the longitudinal direction X. The first gripper 10 can move in the longitudinal direction X with respect to the base 2, and the second gripper 20 is fixed to the base 2. Therefore, the first gripper 10 can move in the longitudinal direction X with respect to the second gripper 20.

The first gripper 10 includes a first placement table 11, a first lid 12, a first hinge 13, and a first gripping force applier 14. The first lid 12 is rotatably connected to the first placement table 11 by the first hinge 13. The first placement table 11 and the first lid 12 are configured to grip the optical fiber F by a gripping force generated by the first gripping force applier 14. A fiber groove extending in the longitudinal direction X and recessed downward is formed on the first placement table 11. The first gripping force applier 14 includes a pressing force applying actuator (not shown in the drawings) such as a motor, and a gear train that transmits power of the pressing force applying actuator to the first lid 12. Although detailed description is omitted, when the pressing force applying actuator of the first gripping force applier 14 is operated, the power is transmitted to the first lid 12 via the gear train and a downward force is applied to the first lid 12. This force serves as a gripping force for the first gripper 10 to grip the optical fiber F. Further, a configuration of the first gripping force applier 14 is not limited to the configuration of one or more embodiments and can be appropriately changed as long as the gripping force can be changed.

The second gripper 20 includes a second placement table 21, a second lid 22, and a second hinge 23. The second lid 22 is rotatably connected to the second placement table 21 by the second hinge 23. The second placement table 21 and the second lid 22 are configured to grip the optical fiber F with a predetermined gripping force. The gripping force due to the second placement table 21 and the second lid 22 may be generated by, for example, a spring, or may be generated by a pressing force applying actuator and a gear train as in the first gripper 10. A fiber groove extending in the longitudinal direction X and recessed downward is formed on the second placement table 21.

In one or more embodiments, as shown in FIG. 1, the cladding f2 is removed over the entire portion from an end portion of the optical fiber F on the –X side to a portion between the first gripper 10 and the second gripper 20. The first gripper 10 grips the cladding f2. The second gripper 20 grips the glass portion f1.

The tension applier A includes a gripper moving actuator 3, a shaft 4, and a movable base 5. The gripper moving actuator 3 is fixed to the base 2 and can move the shaft 4 in the longitudinal direction X. As the gripper moving actuator 3, for example, a linear motion motor can be used. The shaft 4 extends in the longitudinal direction X. The movable base 5 is fixed to an end portion of the shaft 4 on the –X side. When the gripper moving actuator 3 is operated, the shaft 4 and the movable base 5 slide in the longitudinal direction X with respect to the base 2. A slide rail or the like may be provided between the movable base 5 and the base 2.

The movable base 5 supports the first placement table 11. A slide rail 5*a* is provided between the movable base 5 and the first placement table 11. Therefore, the first placement table 11 can move in the longitudinal direction X with respect to the movable base 5. The tension measuring sensor 6 of one or more embodiments is sandwiched between the first placement table 11 and the movable base 5. As a specific kind of the tension measuring sensor 6, for example, a load cell can be used. When the gripper moving actuator 3 moves the shaft 4 to the +X side, a force toward the +X side also acts on the first placement table 11 via the tension measuring sensor 6. At this time, if the first gripper 10 and the second gripper 20 are in a state of gripping the optical fiber F, the optical fiber F is pulled between the first gripper 10 and the second gripper 20. Then, a compressive force corresponding to the tension of the optical fiber F is applied to the tension measuring sensor 6.

Accordingly, the tension of the optical fiber F can be calculated on the basis of the compressive force measured by the tension measuring sensor 6. Further, a structure and a disposition of the tension measuring sensor 6 may be appropriately changed as long as the tension of the optical fiber F can be measured.

The blade 7 is supported by a support part (not shown in the drawings) and can move in a direction perpendicular to the longitudinal direction X with respect to the optical fiber F. That is, the blade 7 can move closer to or further away from the optical fiber F. In the example shown in FIG. 1, the blade 7 moves in a direction perpendicular to both the longitudinal direction X and the vertical direction Z. However, the blade 7 may move in the vertical direction Z or a direction inclined with respect to the vertical direction Z.

The controller 8 controls the gripper moving actuator 3 and the first gripping force applier 14. As the controller 8, for example, an integrated circuit such as a microcontroller, an integrated circuit (IC), a large-scale integrated circuit (LSI), or an application specific integrated circuit (ASIC) can be used.

The controller 8 can control the gripping force with which the first gripper 10 grips the optical fiber F by driving the pressing force applying actuator of the first gripping force applier 14. In controlling the gripping force, the controller 8 may obtain the gripping force by, for example, back-calculating from a drive amount of the pressing force applying actuator. Alternatively, a pressure sensor may be provided in the first gripper 10 and feedback control may be performed on the basis of an output from the pressure sensor.

Next, a cutting method of the optical fiber F by the optical fiber cutting device 1 will be described.

When the optical fiber F is cut using the optical fiber cutting device 1, a gripping force derivation step, a gripping step, and a cutting step are performed.

In the gripping force derivation step, a minimum non-slip gripping force is derived. The minimum non-slip gripping force is a minimum value of a gripping force required for gripping the cladding f2 to apply a predetermined tension to the optical fiber F.

In the gripping step, the optical fiber F is gripped by the first gripper 10 and the second gripper 20. At this time, at least the first gripper 10 grips the cladding f2 of the optical fiber F by a set gripping force determined on the basis of the minimum non-slip gripping force. The second gripper 20 grips the glass portion f1 exposed by removing the cladding f2 of the optical fiber F. In other words, the optical fiber F includes a portion at which the glass portion f1 is exposed from the optical fiber F to outside. The portion at which the glass portion f1 is exposed may be referred to as a glass exposed area.

In the cutting step, the blade 7 is pressed against the glass portion f1 in a state in which the optical fiber F is gripped by the first gripper 10 and the second gripper 20 and a predetermined tension is applied to the optical fiber F. Therefore, when an initial scratch is made on the glass portion f1 and the glass portion f1 is broken with the initial scratch as a starting point, the optical fiber F is cut.

Figure 2:
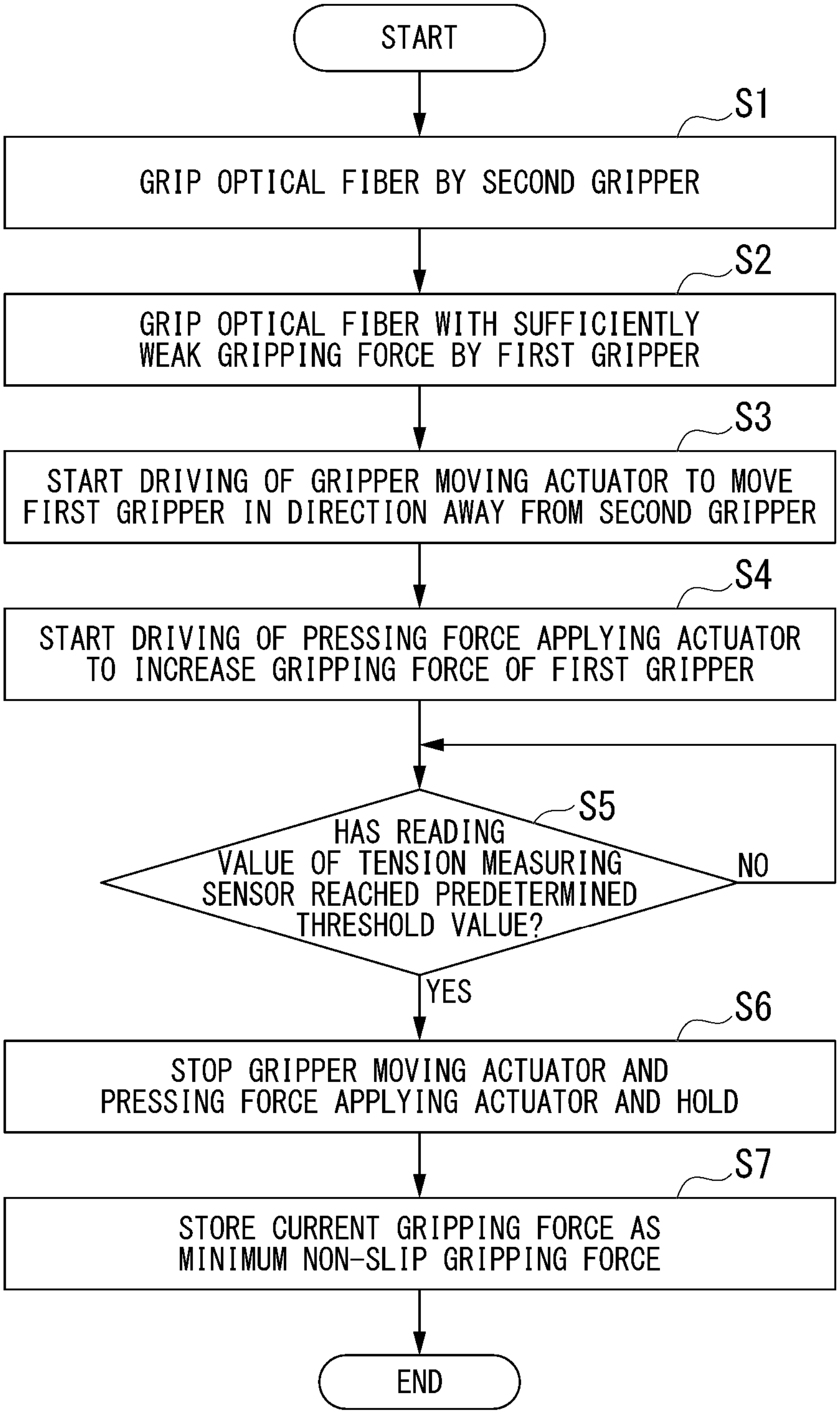
FIG. 2 is a flowchart showing a gripping force derivation step according to the first embodiments.

Next, the gripping force derivation step in one or more embodiments will be described using FIG. 2.

Firstly, the glass portion f1 of the optical fiber F is gripped by the second gripper 20 (step S1). A gripping force at this time is a sufficiently strong force (hereinafter referred to as "non-slip gripping force") that does not cause slipping between the second gripper 20 and the glass portion f1 of the optical fiber F when tension is applied to the optical fiber F. A magnitude of the non-slip gripping force can be obtained by a preliminary experiment or the like. For example, when an outer diameter of the glass portion f1 is 250 μm, the non-slip gripping force can be set to 3 kgf. Further, the glass portion f1 has higher rigidity than the cladding f2 and is less likely to be deformed. Therefore, it is easy to set the non-slip gripping force that does not cause slipping and does not deform the glass portion f1.

Next, the optical fiber F is gripped by the first gripper 10 (step S2). A gripping force at this time is a sufficiently weak force (hereinafter referred to as minute gripping force) that causes slipping between the first gripper 10 and the cladding f2 of the optical fiber F when tension is applied to the optical fiber F. The minute gripping force is generated when the controller 8 controls the pressing force applying actuator of the first gripping force applier 14. A magnitude of the minute gripping force may be a minimum value (for example, approximately 0 gf) of a settable gripping force.

Next, the controller 8 drives the gripper moving actuator 3 to move the first gripper 10 in a direction (+X side) away from the second gripper 20 (step S3). At this point, since the first gripper 10 grips the cladding f2 with a minute gripping force, slipping occurs between the first gripper 10 and the cladding f2. Therefore, no tension acts on the optical fiber F, or weak tension acts on the optical fiber F due to friction between the first gripper 10 and the cladding f2. The tension of the optical fiber F is measured frequently by the tension measuring sensor 6.

Next, the controller 8 drives the pressing force applying actuator of the first gripping force applier 14 so that the gripping force on the cladding f2 by the first gripper 10 gradually increases (step S4). When the gripping force of the first gripper 10 increases, friction between the first gripper 10 and the cladding f2 increases, and tension acting on the optical fiber F increases. That is, a magnitude of the tension of the optical fiber F measured by the tension measuring sensor 6 increases. The increase in the gripping force of the first gripper 10 is continued until it is stopped in step S6 to be described later.

Next, the controller 8 determines whether or not the tension (reading value) of the optical fiber F measured by the tension measuring sensor 6 has reached a predetermined threshold value (step S5). The "predetermined threshold value" is a magnitude of an appropriate tension to be applied to the optical fiber F when the optical fiber F is cut. The magnitude of the "predetermined threshold value" differs according to types of the optical fiber F (for example, types of optical fiber, product model numbers, specifications, or the like), and can be obtained by a preliminary experiment or the like. For example, in the optical fiber F having the glass portion f1 with an outer diameter of 125 μm and made of quartz glass with no cavity, 200 gf may be set as the "predetermined threshold value". Also, in the optical fiber F having the glass portion f1 with an outer diameter of 400 μm, 1 kgf may be set as the "predetermined threshold value".

When the tension of the optical fiber F measured by the tension measuring sensor 6 is smaller than the predetermined threshold value (step S5: NO), the controller 8 makes a determination of repeating step S5. Since the gripping force of the first gripper 10 increases as time elapses, the tension of the optical fiber F measured by the tension measuring sensor 6 also increases. When the tension of the optical fiber F measured by the tension measuring sensor 6 reaches the predetermined threshold value (step S5: YES), the processing proceeds to step S6. A magnitude of the gripping force due to the first gripper 10 at this time is a minimum gripping force (hereinafter, referred to as "minimum non-slip gripping force") that the first gripper 10 can grip the optical fiber F without slipping in a state in which the predetermined threshold tension is applied to the optical fiber F.

In step S6, the controller 8 stops the pressing force applying actuator of the first gripping force applier 14 and the gripper moving actuator 3, and maintains (holds) the state. Therefore, movement of the first gripper 10 toward the +X side and increase in the gripping force of the first gripper 10 are stopped. Accordingly, increase in the tension acting on the optical fiber F also stops.

Next, the controller 8 stores the gripping force of the first gripper 10 at that time in a storage as the minimum non-slip gripping force (step S7). The storage may be provided inside the controller 8 or may be provided outside the controller 8. As the storage, a rewritable memory (a random access memory (RAM), a flash memory, or the like) can be used. As described above, the gripping force derivation step ends. Further, in step S7, the minimum non-slip gripping force itself may be stored, or a control value for applying the minimum non-slip gripping force may be stored. When the pressing force applying actuator is a motor, the "control value for applying the minimum non-slip gripping force" is, for example, a current value of the motor at the time of step S7. Also, in step S7, the storage may store a set gripping force determined on the basis of the minimum non-slip gripping force. Alternatively, the storage may store a control value (for example, a current value of the motor) for applying the set gripping force. In the present specification, "at least one of the minimum non-slip gripping force, the set gripping force, a control value for applying the minimum non-slip gripping force, and a control value for applying the set gripping force" is simply referred to as "minimum non-slip gripping force or the like" in some cases.

After step S7 is completed, the cutting step may be performed while maintaining that state. In this case, the gripping step described above is included in the gripping force derivation step. More specifically, step S6 corresponds to the gripping step.

Alternatively, after step S7 is completed, another optical fiber F of the same type may be reset in the optical fiber cutting device 1, and the gripping step and the cutting step may be performed. In this case, a force larger than the obtained minimum non-slip gripping force may be used as the set gripping force of the first gripper 10. The reason for this will be described later. Further, the "set gripping force" in the present specification is a set value of the gripping force with which the first gripper 10 or the second gripper 20 grips the optical fiber F, which is determined on the basis of the minimum non-slip gripping force.

Experimental Example

Next, the reason why an appropriate cut surface can be obtained by the above-described cutting method will be described using results of an experimental example shown in FIG. 3.

In the present experimental example, a plurality of optical fibers F were prepared, cutting was performed by making magnitudes of the gripping force applied to the cladding f2 different, and a relationship between the gripping force and an inclination angle of a cut surface was investigated. The gripping force was varied in a range of 0 to +2000 gf with respect to the minimum non-slip gripping force. The horizontal axis of FIG. 3 represents the gripping force applied to the cladding f2 as an offset value with respect to the minimum non-slip gripping force. The vertical axis of FIG. 3 represents an angle of the cut surface (end surface) with respect to a surface perpendicular to the longitudinal direction X when the optical fiber F is cut with it gripped with each gripping force. As the angle of the end surface becomes smaller, an optical connection loss can be made smaller when the optical fiber F is fusion-spliced or the optical fiber F is abutted against another optical system.

Figure 3:
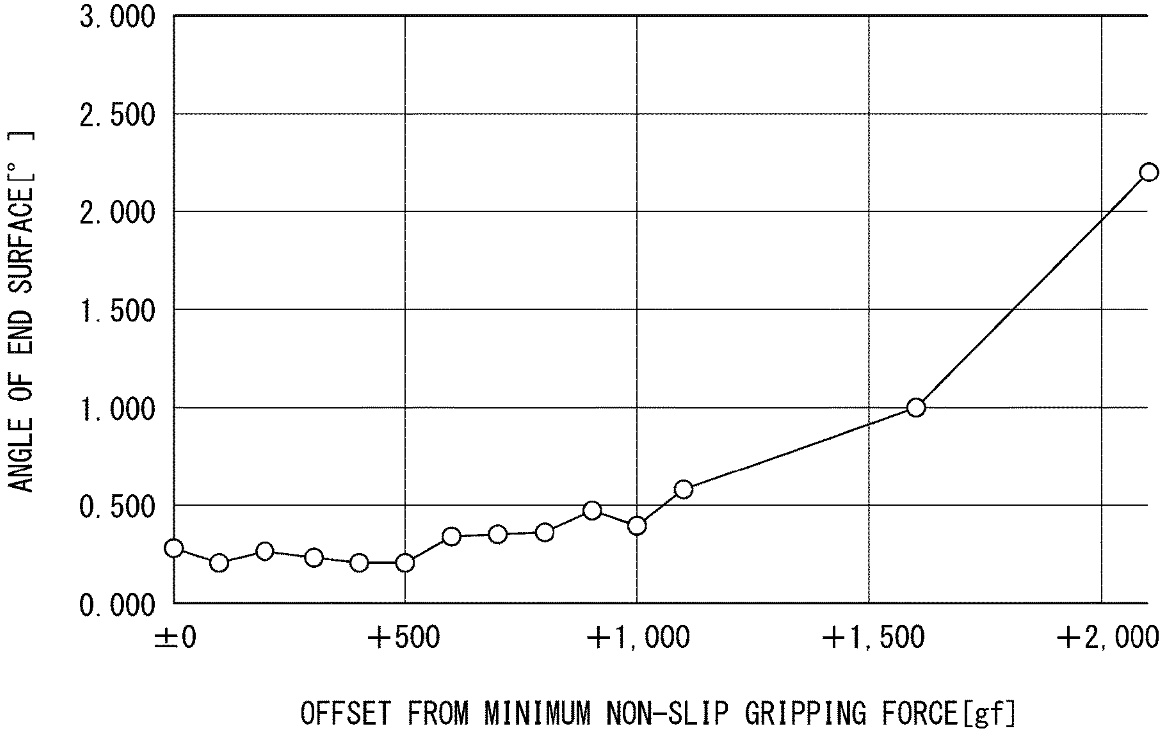
FIG. 3 is a graph showing a relationship between a gripping force and an angle of an end surface of a cut optical fiber.

As shown in FIG. 3, the angle of the end surface increases as the gripping force becomes larger. It is thought that the reason for this is because, when the cladding f2 is gripped with an excessive force, the cladding f2 is largely compressively deformed, and the glass portion f1 of the optical fiber F is bent to be inclined with respect to the longitudinal direction X. More specifically, when the cladding f2 is compressively deformed by, for example, the first gripper 10, bending stress is generated in the cladding f2 at a boundary between a portion gripped by the first gripper 10 and a portion that is not gripped. As the gripping force becomes larger, the bending stress also increases and bending is more likely to occur in the optical fiber F. As a result, an angle of the end surface becomes large.

According to the results of FIG. 3, when the gripping force was in a range of 0 to +1000 gf with respect to the minimum non-slip gripping force, the angle of the end surface could be set to 0.5° or less. Also, when the gripping force was in a range of 0 to +500 gf with respect to the minimum non-slip gripping force, the angle of the end surface could be set to 0.3° or less. In this way, it was ascertained that an angle of the end surface could be reduced by bringing the gripping force closer to the minimum non-slip gripping force.

However, due to variation in mechanical operations of the first gripper 10 or the second gripper 20, a magnitude of the gripping force that is actually generated may not be constant each time the optical fiber F is gripped even if the set gripping force is the same, and variation may occur to some extent. Therefore, a value that is large to some extent (for example, by 50 gf to 220 gf) with respect to the minimum non-slip gripping force may be set as the set gripping force. Accordingly, the actual gripping force falling below the minimum non-slip gripping force due to variation can be suppressed. Also, according to FIG. 3, if the gripping force is smaller than +500 gf with respect to the minimum non-slip gripping force, the same cutting accuracy as that when the optical fiber F is gripped with the minimum non-slip gripping force can be obtained. Therefore, the controller 8 may be configured to determine a value larger than the minimum non-slip gripping force as the set gripping force on the basis of the minimum non-slip gripping force obtained by the gripping force derivation step.

As described above, in the optical fiber cutting method of one or more embodiments, the optical fiber F is cut by gripping the optical fiber F with a pair of grippers 10 and 20 (steps S1 and S2), separating the pair of grippers 10 and 20 from each other in the longitudinal direction X of the optical fiber F while changing a gripping force of at least one of the pair of grippers 10 and 20 (steps S3 and S4), setting a gripping force when tension applied to the optical fiber F reaches a predetermined threshold value as the minimum non-slip gripping force (steps S5 to S7), gripping the optical fiber F by at least one of the pair of grippers 10 and 20 with the set gripping force determined on the basis of the minimum non-slip gripping force, and applying the blade 7 to the glass portion f1 of the optical fiber F positioned between the pair of grippers 10 and 20.

Also, the optical fiber cutting device 1 of one or more embodiments includes the pair of grippers 10 and 20 for gripping the optical fiber F, the gripping force applier 14 provided to at least one of the pair of grippers 10 and 20 and capable of changing the gripping force, the tension applier A that applies tension to the optical fiber F by separating the pair of grippers 10 and 20 from each other in the longitudinal direction X of the optical fiber F, the tension measuring sensor 6 that measures the tension, the controller 8 that controls the gripping force generated by gripping force applier 14, and the blade 7 positioned between the pair of grippers 10 and 20 in the longitudinal direction X and making a scratch on the glass portion f1 of the optical fiber F, in which the controller 8 determines a set gripping force on the basis of a minimum gripping force (minimum non-slip gripping force) in which at least one of the pair of grippers 10 and 20 can grip the optical fiber F without slipping in a state in which a predetermined tension is applied to the optical fiber F, and cuts the optical fiber F with the blade 7 by applying tension to the optical fiber F while at least one of the pair of grippers 10 and 20 grips the optical fiber F with the set gripping force.

According to such a method of cutting an optical fiber or an optical fiber cutting device 1, the optical fiber F is gripped by the set gripping force determined on the basis of the minimum non-slip gripping force. Therefore, when the optical fiber F is cut, the gripping force of the optical fiber F becoming excessively large can be avoided, and an angle of the cut surface of the optical fiber F becoming large can be suppressed. Also, slipping of the optical fiber F because of an insufficient gripping force at the time of cutting can be suppressed. Conventionally, there have been cases in which a magnitude of the gripping force is determined on the basis of experience or intuition of an operator. In contrast, as in the optical fiber cutting device according to one or more embodiments, when the set gripping force is determined on the basis of the minimum non-slip gripping force, variation among workers in cutting work can be suppressed, and the optical fiber can be cut more stably and reliably.

Also, the optical fiber cutting device 1 of one or more embodiments may include a storage that stores at least one of the minimum non-slip gripping force, the set gripping force, a control value for applying the minimum non-slip gripping force, and a control value for applying the set gripping force. In this case, the minimum non-slip gripping force or the like can be read and used in the next and subsequent operations. It is thought that the minimum non-slip gripping force is substantially the same if the optical fibers F of the same type are used. That is, once the minimum non-slip gripping force is measured and the set gripping force is determined, an appropriate gripping force can be obtained in subsequent cutting of the optical fibers F of the same type by employing the same set gripping force. Accordingly, an efficiency when the optical fibers F are repeatedly cut can be improved.

Also, in one or more embodiments, the optical fiber F is gripped so as to cause slipping in at least one of the pair of grippers 10 and 20, and the pair of grippers 10 and 20 are moved to be separated from each other in the longitudinal direction X of the optical fiber F while increasing a gripping force of at least one of the pair of grippers 10 and 20, in which the gripping force when tension applied to the optical fiber F reaches the predetermined threshold value is defined as the minimum non-slip gripping force. According to this configuration, in measuring the minimum non-slip gripping force, occurrence of plastic deformation due to a large gripping force applied to the cladding f2 can be suppressed. Also, in the optical fiber F in which a cavity is provided in the glass portion f1, the cavity portion being damaged due to an excessive gripping force can be suppressed. Accordingly, the optical fiber F after measuring the minimum non-slip gripping force as it is can be cut, and the cut optical fiber F can be utilized.

Second Embodiments

Next, second embodiments according to the invention will be described, but a basic configuration is the same as that of the first embodiments. Therefore, components which are the same are denoted by the same reference signs, description thereof will be omitted, and only different points will be described.

Figure 4:
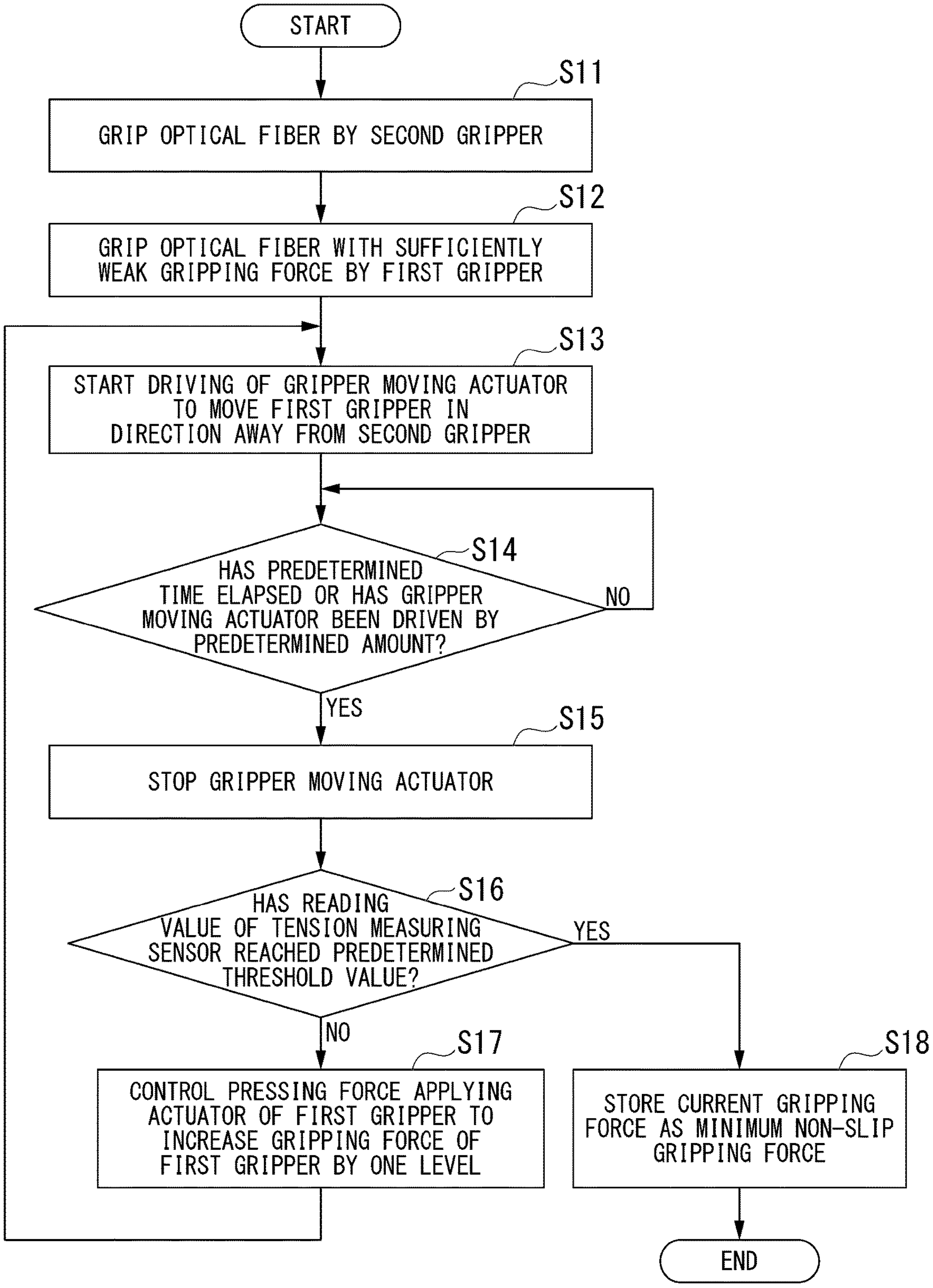
FIG. 4 is a flowchart showing a gripping force derivation step according to second embodiments.

FIG. 4 is a flowchart showing a gripping force derivation step in the second embodiments. As shown in FIG. 4, in one or more embodiments, an optical fiber F is firstly gripped by a second gripper 20 (step S11). A gripping force at this time is a non-slip gripping force as in step S1 of the first embodiments.

Next, the optical fiber F is gripped by a first gripper 10 (step S12). A gripping force at this time is a minute gripping force as in step S2 of the first embodiments.

Next, a controller 8 drives a gripper moving actuator 3 to move the first gripper 10 in a direction (+X side) away from the second gripper 20 (step S13). This point is also the same as step S3 of the first embodiments.

Next, the controller 8 determines whether or not a predetermined time has elapsed. Alternatively, the controller 8 determines whether or not the gripper moving actuator 3 has been driven by a predetermined amount (step S14). If the predetermined time has not elapsed, or if the gripper moving actuator 3 has not been driven by the predetermined amount, step S14 is repeated (step S14: NO). If the predetermined time has elapsed, or if the gripper moving actuator 3 has been driven by the predetermined amount, the processing proceeds to step S15 (step S14: YES).

In step S15, the controller 8 stops the gripper moving actuator 3. Next, the controller 8 determines whether or not a reading value of a tension measuring sensor 6 has reached a predetermined threshold value (step S16). The "predetermined threshold value" is as described in step S5 of the first embodiments. If the reading value of the tension measuring sensor 6 has not reached the predetermined threshold value (step S16: NO), the processing proceeds to step S17.

In step S17, the controller 8 controls a pressing force applying actuator of a first gripping force applier 14 to increase the gripping force of the first gripper 10 by one level (step S17). A size of the "one level" can be optionally set, but the smaller the size, the better the measurement accuracy of the minimum non-slip gripping force and the longer the measurement time of the minimum non-slip gripping force. For example, if the size of the "one level" is set within a range of 10 gf to 50 gf, both the measurement accuracy and the measurement time of the minimum non-slip gripping force can be achieved.

After step S17, the controller 8 repeats steps S13 to S16 again. Therefore, the gripping force of the first gripper 10 increases in stages, and tension of the optical fiber F measured by the tension measuring sensor 6 also increases. In step S16, when the reading value of the tension measuring sensor 6 reaches the predetermined threshold value (step S16: YES), the processing proceeds to step S18.

In step S18, the controller 8 stores the gripping force of the first gripper 10 at that time in the storage as the minimum non-slip gripping force. As in step S7 in the first embodiments, the storage may store the minimum non-slip gripping force itself, or may store a control value for applying the minimum non-slip gripping force. Also, the storage may store the set gripping force or may store a control value for applying the set gripping force.

According to one or more embodiments, the determination in step S16 is performed with the gripper moving actuator 3 stopped. Accordingly, even when a difference between a dynamic frictional force and a static frictional force acting between the first gripper 10 and the optical fiber F is large, the minimum non-slip gripping force can be accurately measured.

Third Embodiments

Next, third embodiments according to the invention will be described, but a basic configuration is the same as that of the first embodiments. Therefore, components which are the same are denoted by the same reference signs, description thereof will be omitted, and only different points will be described.

Figure 5:
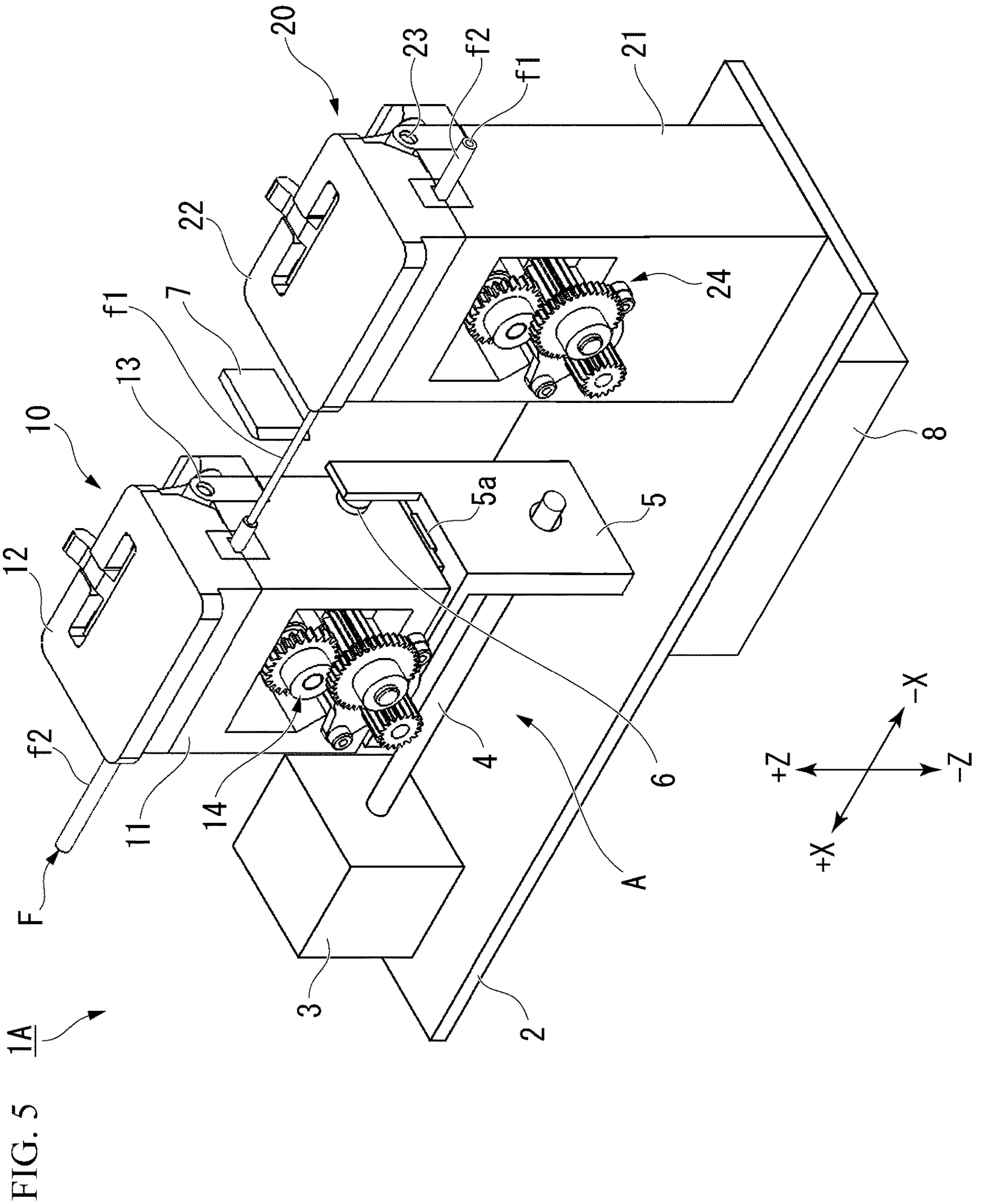
FIG. 5 is a perspective view showing an optical fiber cutting device according to third embodiments.

In the first and second embodiments, the first gripper 10 grips the cladding f2, and the second gripper 20 grips the glass portion f1. On the other hand, in one or more embodiments, both a first gripper 10 and a second gripper 20 grip a cladding f2 as shown in FIG. 5. An optical fiber F is in a state in which the cladding f2 is removed and a glass portion f1 is exposed at a portion between the first gripper 10 and the second gripper 20.

As shown in FIG. 5, an optical fiber cutting device 1A of one or more embodiments includes a second gripping force applier 24. The second gripping force applier 24 includes a pressing force applying actuator (not shown in the drawings) such as a motor, and a gear train that transmits power of the pressing force applying actuator to a second lid 22. Although detailed description is omitted, when the pressing force applying actuator of the second gripping force applier 24 is operated, the power is transmitted to the second lid 22 via the gear train and a downward force is applied to the second lid 22. This force serves as a gripping force for the second gripper 20 to grip the optical fiber F. Further, a configuration of the second gripping force applier 24 is not limited to the configuration of one or more embodiments and can be appropriately changed as long as the gripping force can be changed.

That is, the optical fiber cutting device 1A is provided with a gripping force applier including the first gripping force applier 14 and the second gripping force applier 24. In other words, the optical fiber cutting device 1A includes a pair of gripping force appliers. The first gripping force applier 14 is configured to change a gripping force of the first gripper 10 serving as one of the pair of grippers. The second gripping force applier 24 is configured to change a gripping force of the second gripper 20 serving as the other of the pair of grippers.

A controller 8 can control the gripping force with which the second gripper 20 grips the optical fiber F by driving the pressing force applying actuator of the second gripping force applier 24. In controlling the gripping force, the controller 8 may obtain the gripping force by, for example, back-calculating from a drive amount of the pressing force applying actuator. Alternatively, a pressure sensor may be provided in the second gripper 20 and feedback control may be performed on the basis of an output from the pressure sensor.

That is, the controller 8 can control the gripping force (first gripping force) generated by the first gripping force applier 14 and the gripping force (second gripping force) generated by the second gripping force applier 24.

Particularly, the controller 8 can control the gripping force generated by the first gripping force applier 14 and the gripping force generated by the second gripping force applier 24 to be equal to each other.

Figure 6:
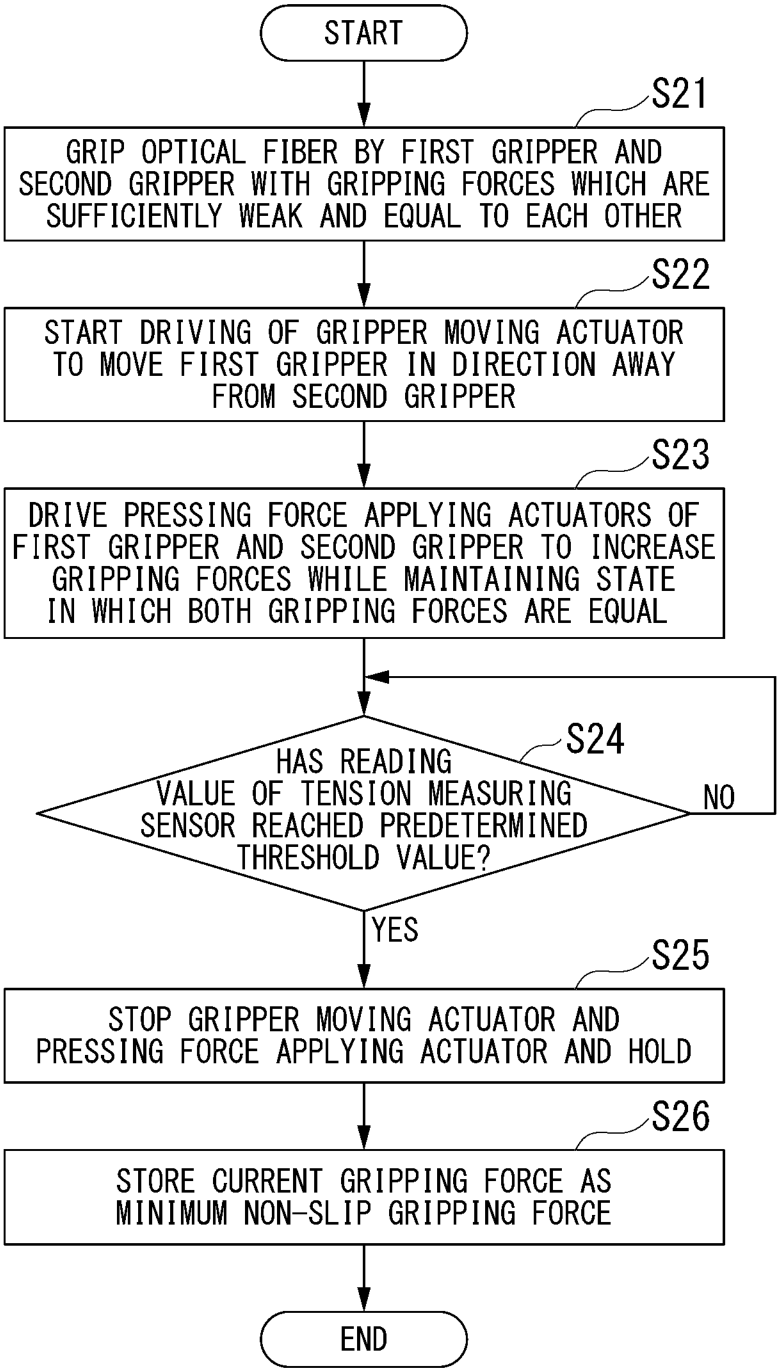
FIG. 6 is a flowchart showing a gripping force derivation step according to the third embodiments.

Next, a gripping force derivation step in one or more embodiments will be described using FIG. 6. As shown in FIG. 6, in one or more embodiments, the optical fiber F is firstly gripped by the first gripper 10 and the second gripper 20 (step S21). At this time, gripping forces of the first gripper 10 and the second gripper 20 are equal to each other and are minute gripping forces as in step S1 of the first embodiments.

Next, the controller 8 drives a gripper moving actuator 3 to move the first gripper 10 in a direction (+X side) away from the second gripper 20 (step S22). At this point, the grippers 10 and 20 grip the cladding f2 with the minute gripping force, and slipping occurs between the grippers 10 and 20 and the cladding f2. Therefore, no tension acts on the optical fiber F, or weak tension acts on the optical fiber F due to friction between the grippers 10 and 20 and the cladding f2. The tension of the optical fiber F is measured frequently by a tension measuring sensor 6.

Next, the controller 8 drives the pressing force applying actuators of the gripping force appliers 14 and 24 so that the gripping forces gradually increase while maintaining a state in which the gripping forces of the grippers 10 and 20 are equal to each other (step S23). When the gripping forces of the grippers 10 and 20 increase, friction between the grippers 10 and 20 and the cladding f2 increases, and tension acting on the optical fiber F increases. That is, a magnitude of the tension of the optical fiber F measured by the tension measuring sensor 6 increases. The increase in the gripping forces of the grippers 10 and 20 is continued until it is stopped in step S25 to be described later.

Next, the controller 8 determines whether or not the tension (reading value) of the optical fiber F measured by the tension measuring sensor 6 has reached a predetermined threshold value (step S24). The "predetermined threshold value" is as described in step S5 of the first embodiments. When the tension of the optical fiber F measured by the tension measuring sensor 6 is smaller than the predetermined threshold value (step S24: NO), the controller 8 makes a determination of repeating step S24. Since the gripping forces of the grippers 10 and 20 increase as time elapses, the tension of the optical fiber F measured by the tension measuring sensor 6 also increases.

When the tension of the optical fiber F measured by the tension measuring sensor 6 reaches the predetermined threshold value (step S24: YES), the processing proceeds to step S25. A magnitude of the gripping force due to the grippers 10 and 20 at this time is a minimum non-slip gripping force. That is, the minimum non-slip gripping force is obtained by separating the first gripper 10 and the second gripper 20 from each other in the longitudinal direction of the optical fiber while changing the gripping force of the first gripper 10 and the gripping force of the second gripper 20. Particularly, the gripping force of the first gripper 10 and the gripping force of the second gripper 20 are changed such that the gripping force of the first gripper 10 and the gripping force of the second gripper 20 are equal to each other.

In step S25, the controller 8 stops the pressing force applying actuators of the gripping force appliers 14 and 24 and the gripper moving actuator 3, and maintains (holds) the state. With this matter, movement of the first gripper 10 toward the +X side and the increase in the gripping forces of the grippers 10 and 20 are stopped. Accordingly, increase in the tension acting on the optical fiber F also stops.

Next, the controller 8 stores the gripping forces of the grippers 10 and 20 at that time in the storage as the minimum non-slip gripping force (step S26). As in step S7 in the first embodiments, the controller 8 may store the minimum non-slip gripping force itself, or may store a control value for applying the minimum non-slip gripping force in the storage. Also, the storage may store a set gripping force or may store a control value for applying the set gripping force.

According to one or more embodiments, occurrence of plastic deformation due to a large gripping force applied to the cladding f2 can be suppressed in both the grippers 10 and 20. As a result, the optical fiber F after measuring the minimum non-slip gripping force as it is can be cut, and both the optical fibers F cut into two can be utilized.

Fourth Embodiments

Next, fourth embodiments according to the invention will be described, but a basic configuration is the same as that of the third embodiments. Therefore, components which are the same are denoted by the same reference signs, description thereof will be omitted, and only different points will be described.

Figure 7:
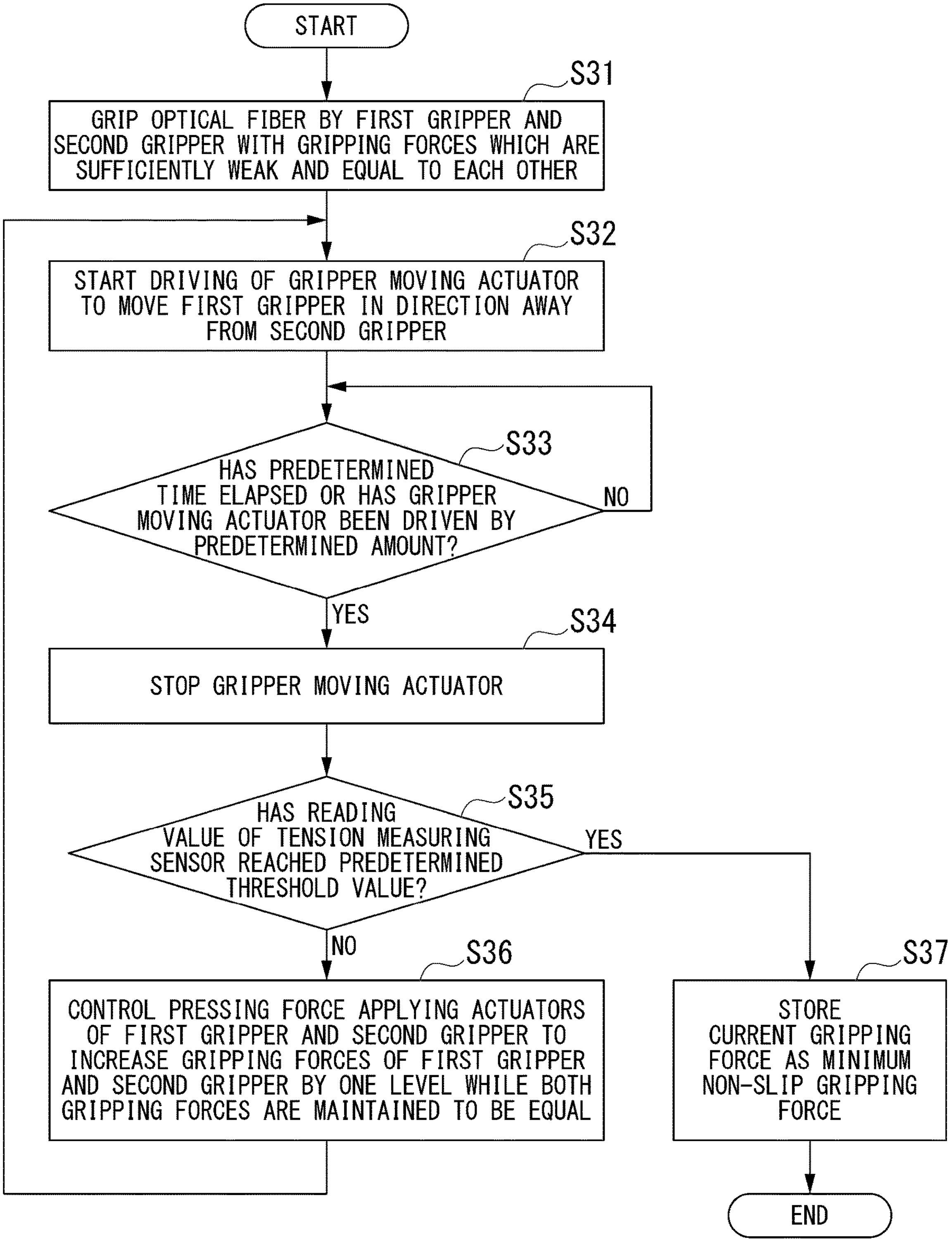
FIG. 7 is a flowchart showing a gripping force derivation step according to fourth embodiments.

FIG. 7 is a flowchart showing a gripping force derivation step in the fourth embodiments. As shown in FIG. 7, in one or more embodiments, an optical fiber F is firstly gripped by a first gripper 10 and a second gripper 20 (step S31). At this time, gripping forces of the first gripper 10 and the second gripper 20 are equal to each other and are minute gripping forces as in step S21 of the third embodiments.

Next, a controller 8 drives a gripper moving actuator 3 to move the first gripper 10 in a direction (+X side) away from the second gripper 20 (step S32). This point is also the same as that in step S22 of the third embodiments.

Next, the controller 8 determines whether or not a predetermined time has elapsed. Alternatively, the controller 8 determines whether or not the gripper moving actuator 3 has been driven by a predetermined amount (step S33). If the predetermined time has not elapsed, or if the gripper moving actuator 3 has not been driven by the predetermined amount, step S33 is repeated (step S33: NO). If the predetermined time has elapsed, or if the gripper moving actuator 3 has been driven by the predetermined amount, the processing proceeds to step S34 (step S33: YES).

In step S34, the controller 8 stops the gripper moving actuator 3. Next, the controller 8 determines whether or not a reading value of a tension measuring sensor 6 has reached a predetermined threshold value (step S35). The "predetermined threshold value" is as described in step S5 of the first embodiments. If the reading value of the tension measuring sensor 6 has not reached the predetermined threshold value (step S35: NO), the processing proceeds to step S36.

In step S36, the controller 8 controls pressing force applying actuators of gripping force appliers 14 and 24 to increase gripping forces of the grippers 10 and 20 by one level while maintaining a state in which the gripping forces are equal to each other (step S36). A size of the "one level" is the same as that in step S17 of the second embodiments.

After step S36, the controller 8 repeats steps S32 to S35 again. Therefore, the gripping forces of the grippers 10 and 20 increase in stages, and tension of the optical fiber F measured by the tension measuring sensor 6 also increases. In step S35, when the reading value of the tension measuring sensor 6 reaches the predetermined threshold value (step S35: YES), the processing proceeds to step S37.

In step S37, the controller 8 stores the gripping forces of the grippers 10 and 20 at that time in a storage as a minimum non-slip gripping force. As in step S7 in the first embodiments, the storage may store the minimum non-slip gripping force itself, or may store a control value for applying the minimum non-slip gripping force. Also, the storage may store a set gripping force or may store a control value for applying the set gripping force.

According to one or more embodiments, the determination in step S35 is performed with the gripper moving actuator 3 stopped. Accordingly, even when a difference between a dynamic frictional force and a static frictional force acting between the grippers 10 and 20 and the optical fiber F is large, the minimum non-slip gripping force can be accurately measured.

Fifth Embodiments

Next, fifth embodiments according to the invention will be described, but a basic configuration is the same as that of the first embodiments. Therefore, components which are the same are denoted by the same reference signs, description thereof will be omitted, and only different points will be described.

In the first to fourth embodiments, at least the gripping force of the first gripper 10 was increased with the minute gripping force as a starting point, and a gripping force when the tension of the optical fiber F reached a predetermined threshold value was defined as the minimum non-slip gripping force. On the other hand, in one or more embodiments, a gripping force of a first gripper 10 is reduced with a non-slip gripping force as a starting point, and a gripping force when tension of an optical fiber F falls below a predetermined threshold value is defined as the minimum non-slip gripping force. Hereinafter, description will be made in more detail using FIG. 8.

Figure 8:
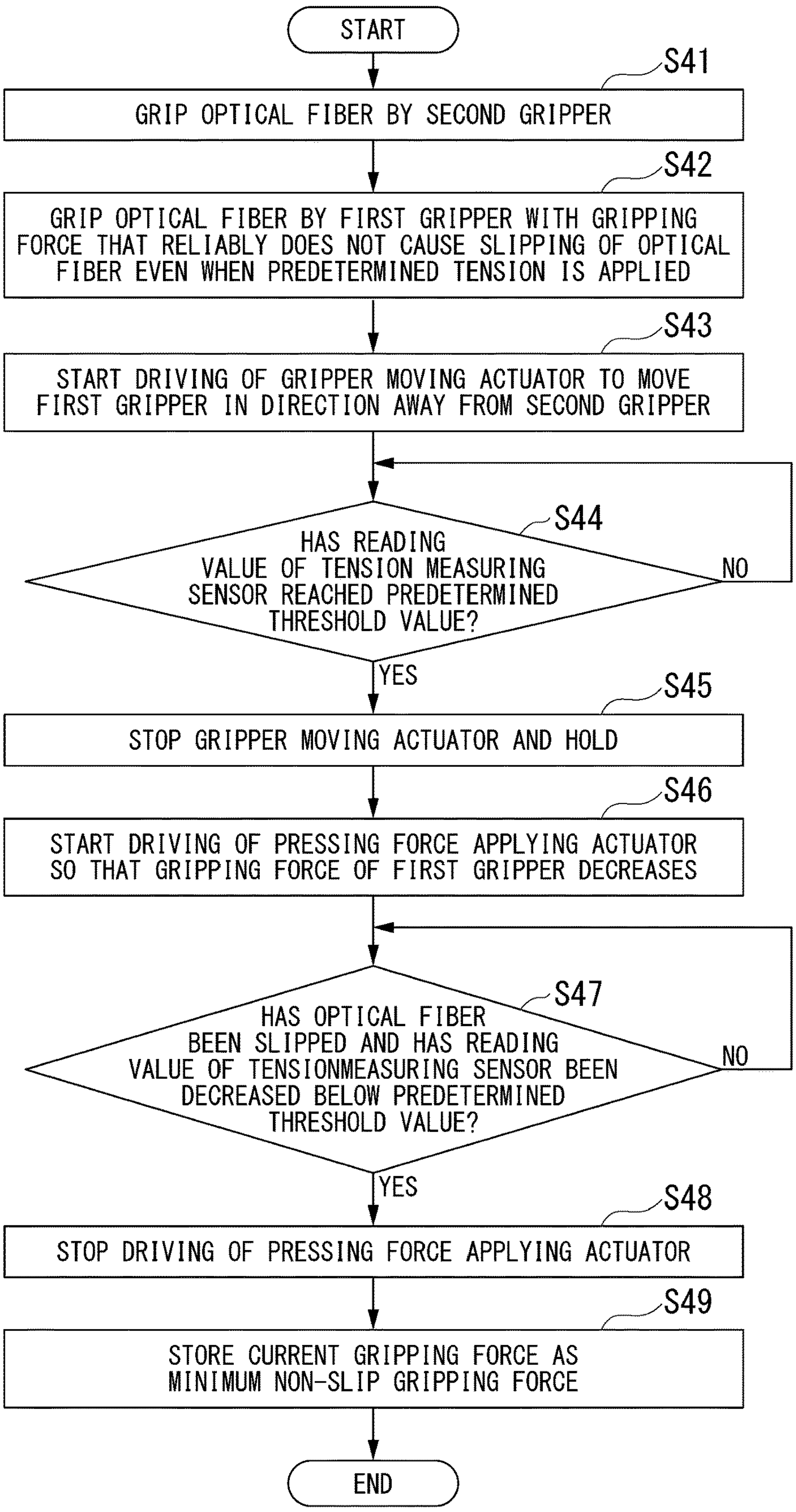
FIG. 8 is a flowchart showing a gripping force derivation step according to fifth embodiments.

As shown in FIG. 8, in one or more embodiments, the optical fiber F is firstly gripped by a second gripper 20 (step S41). A gripping force at this time is the same as the non-slip gripping force in the first embodiments.

Next, the optical fiber F is gripped by the first gripper 10 (step S42). A gripping force at this time is set to the non-slip gripping force by a controller 8 controlling a pressing force applying actuator of a first gripping force applier 14. Further, the gripping force may be different between the first gripper 10 and the second gripper 20 as long as the gripping force does not cause slipping in both the first gripper 10 and the second gripper 20 even when a predetermined tension is applied to the optical fiber F.

Next, the controller 8 drives a gripper moving actuator 3 to move the first gripper 10 in a direction (+X side) away from the second gripper 20 (step S43). At this time, since both the first gripper 10 and the second gripper 20 grip the optical fiber F with the non-slip gripping force, tension acts on the optical fiber F quickly as long as there is no slackening in the optical fiber F.

Next, the controller 8 determines whether or not the tension (reading value) of the optical fiber F measured by a tension measuring sensor 6 has reached a predetermined threshold value (step S44). The "predetermined threshold value" is as described in step S5 of the first embodiments. If the reading value of the tension measuring sensor 6 has not reached the predetermined threshold value (step S44: NO), step S44 is repeated. Since the first gripper 10 is moved to the +X side even during this period by driving of the gripper moving actuator 3, slackening of the optical fiber F is eventually eliminated and tension acts on the optical fiber F.

When the tension of the optical fiber F measured by the tension measuring sensor 6 reaches the predetermined threshold value (step S44: YES), the processing proceeds to step S45.

In step S45, the controller 8 stops driving of the gripper moving actuator 3 and maintains (holds) the state. Therefore, it becomes a state in which a predetermined tension is applied to the optical fiber F while the first gripper 10 is stopped.

Next, the controller 8 drives the pressing force applying actuator of the first gripping force applier 14 so that the gripping force on a cladding f2 by the first gripper 10 gradually decreases (step S46). When the gripping force of the first gripper 10 is reduced, a frictional force between the first gripper 10 and the cladding f2 gradually decreases.

Next, the controller 8 determines whether or not the reading value of the tension measuring sensor 6 has fallen below the predetermined threshold value (step S47). When the tension of the optical fiber F measured by the tension measuring sensor 6 is larger than the predetermined threshold value (step S47: NO), the controller 8 makes a determination of repeating step S47. Since the gripping force of the first gripper 10 decreases as time elapses, the frictional force between the first gripper 10 and the cladding f2 eventually falls below the tension of the optical fiber F. At this time, slipping occurs between the first gripper 10 and the cladding f2, and the tension of the optical fiber F decreases. The controller 8 proceeds to step S48 when the tension of the optical fiber F measured by the tension measuring sensor 6 falls below the predetermined threshold value (step S47: YES).

In step S48, the controller 8 stops driving of the pressing force applying actuator of the first gripping force applier 14.

Next, the controller 8 stores the gripping force of the first gripper 10 at that time in a storage as the minimum non-slip gripping force (step S49). As in step S7 in the first embodiments, the storage may store the minimum non-slip gripping force itself, or may store a control value for applying the minimum non-slip gripping force. Also, the storage may store a set gripping force or may store a control value for applying the set gripping force.

As described above, in one or more embodiments, the optical fiber F is gripped by the pair of grippers 10 and 20 so as not to cause slipping, and the pair of grippers 10 and 20 are separated from each other in the longitudinal direction of the optical fiber F while reducing a gripping force of at least one of the pair of grippers 10 and 20, in which the gripping force when slipping occurs between the grippers 10 and 20 having the reduced gripping force and the optical fiber F is defined as the minimum non-slip gripping force. According to this configuration, in measuring the minimum non-slip gripping force, a stroke when the grippers 10 and 20 are separated from each other can be reduced. More specifically, when in a state in which slackening of the optical fiber F between the first gripper 10 and the second gripper 20 is eliminated and tension acts on the optical fiber F, any further movement of the grippers 10 and 20 is not necessary. Therefore, a size of the optical fiber cutting device 1 in the longitudinal direction X can be reduced, and a time required for measuring the minimum non-slip gripping force can also be reduced.

Further, the technical scope of the invention is not limited to the above-described embodiments, and various modifications can be made without departing from the spirit of the invention.

For example, it has been configured such that only the first gripper 10 of the pair of grippers 10 and 20 moves in the first to fifth embodiments, but a configuration in which the second gripper 20 moves toward the −X side may also be employed. Also, other configurations may also be employed as long as a distance between the first gripper 10 and the second gripper 20 can be changed. Also, in the gripping force derivation step in the first to fifth embodiments, the derived minimum non-slip gripping force and the like have been stored in the storage (steps S7, S18, S26, S37, and S49). However, it is not indispensable that the storage stores the minimum non-slip gripping force and the like. For example, the operator can record and utilize the minimum non-slip gripping force and the like. Therefore, the optical fiber cutting devices 1 and 1A may not include a storage. Also, instead of the blade 7, the glass portion f1 may be irradiated with laser to form a scratch thereon.

In addition, the components in the above-described embodiments can be appropriately replaced with well-known components within a range not departing from the spirit of the invention, and the embodiments and modified examples described above may be appropriately combined.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1, 1A Optical fiber cutting device
6 Tension measuring sensor
7 Blade
8 Controller
10, 20 Gripper
14 Gripping force applier
A Tension applier
F Optical fiber
f1 Glass portion

The invention claimed is:

1. An optical fiber cutting device comprising:
- a first gripper and a second gripper that grip an optical fiber having a glass portion exposed from the optical fiber;
- a first gripping force applier disposed in the first gripper and that generates and changes a first gripping force of the first gripper;
- a tension applier that applies tension to the optical fiber by separating the first gripper from the second gripper in a longitudinal direction of the optical fiber;
- a tension measuring sensor that measures the tension;
- a controller that controls the first gripping force for the first gripper to grip the optical fiber; and
- a blade disposed between the first gripper and the second gripper in the longitudinal direction and that forms a scratch on the glass portion, wherein
- the controller determines a set gripping force, in a state in which the tension is a predetermined value, based on a minimum non-slip gripping force that enables one or both of the first gripper and the second gripper to grip the optical fiber without slipping,
- in a state in which one or both of the first gripper and the second gripper grip the optical fiber with the set gripping force, the blade forms the scratch and the optical fiber cutting device cuts the optical fiber by applying the tension to the optical fiber, and
- the controller determines the minimum non-slip gripping force by:
  - controlling the tension applier to apply the tension to the optical fiber and controlling the first gripping force applier to apply the first gripping force to the first gripper, while the tension is applied to the optical fiber, the controller reduces a value of the first gripping force until slippage between the first gripper and the optical fiber occurs, and
  - in response to the slippage, determining the minimum non-slip gripping force to be the value of the first gripping force when the slippage occurs.

2. The optical fiber cutting device according to claim 1, further comprising a storage that stores one or more of:
- the minimum non-slip gripping force,
- the set gripping force,
- a control value for applying the minimum non-slip gripping force, and
- a control value for applying the set gripping force.

3. The optical fiber cutting device according to claim 1, further comprising
- a second gripping force applier that changes a second gripping force of the second gripper, wherein
- the controller controls the second gripping force.

4. The optical fiber cutting device according to claim 3, wherein the controller controls the first gripping force and the second gripping force to be equal to each other.

5. An optical fiber cutting device comprising:
- a first gripper and a second gripper that grip an optical fiber having a glass portion exposed from the optical fiber;
- a first gripping force applier disposed in the first gripper and that generates and changes a first gripping force;
- a tension applier that comprises a gripper moving actuator that applies tension to the optical fiber by separating the first gripper from the second gripper in a longitudinal direction of the optical fiber;
- a tension measuring sensor that measures the tension;
- a controller that:
  - controls the first gripping force to grip the optical fiber, and
  - determines a set gripping force, in a state in which the tension is a predetermined value, based on a minimum non-slip gripping force that enables the first gripper to grip the optical fiber without slipping;
- a blade disposed between the first gripper and the second gripper in the longitudinal direction and that forms a scratch on the glass portion; and
- a storage that stores one or more of:
  - the minimum non-slip gripping force,
  - the set gripping force,
  - a control value for applying the minimum non-slip gripping force, and
  - a control value for applying the set gripping force, wherein
- in a state in which the first gripper grips the optical fiber with the set gripping force, the blade forms the scratch and the optical fiber cutting device cuts the optical fiber by applying the tension to the optical fiber,
- the first gripping force applier comprises a first pressing force applying actuator that changes the first gripping force,
- the controller:
  - until the controller determines the tension of the optical fiber measured by the tension measuring sensor has reached a predetermined threshold,
    - moves the first gripper in a direction away from the second gripper by driving the gripper moving actuator, and
    - further drives the first pressing force applying actuator such that the first gripping force increases,
  - in response to the tension reaching the predetermined threshold,
    - stops the first pressing force applying actuator to hold the first gripping force and the gripper moving actuator to hold a relative position of the first gripper with respect to the second gripper, and
    - stores the first gripping force as a first minimum non-slip gripping force in the storage and determines the set gripping force based on the first minimum non-slip gripping force.

* * * * *